(12) United States Patent
Kim et al.

(10) Patent No.: US 11,457,195 B2
(45) Date of Patent: Sep. 27, 2022

(54) PORTABLE DEVICE AND CONTROL METHOD THEREOF

(71) Applicant: Samsung Electronics Co., Ltd., Suwon-si (KR)

(72) Inventors: Kibo Kim, Suwon-si (KR); Sejun Kim, Suwon-si (KR); Taedon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/276,595

(22) PCT Filed: May 17, 2019

(86) PCT No.: PCT/KR2019/005888
§ 371 (c)(1),
(2) Date: Mar. 16, 2021

(87) PCT Pub. No.: WO2020/080632
PCT Pub. Date: Apr. 23, 2020

(65) Prior Publication Data
US 2022/0046216 A1     Feb. 10, 2022

(30) Foreign Application Priority Data
Oct. 18, 2018   (KR) .................. 10-2018-0124125

(51) Int. Cl.
*H04N 13/117*     (2018.01)
*H04N 13/167*     (2018.01)
(Continued)

(52) U.S. Cl.
CPC ......... *H04N 13/117* (2018.05); *H04N 13/167* (2018.05); *H04N 21/41407* (2013.01);
(Continued)

(58) Field of Classification Search
CPC .............. H04N 13/117; H04N 13/167; H04N 21/41407; H04N 21/43076; H04N 21/43637; H04N 21/816
See application file for complete search history.

(56) References Cited

U.S. PATENT DOCUMENTS 10,463,962 B2 *  11/2019  Marks ................ A63F 13/5255
11,163,358 B2 *  11/2021  Marks .................... A63F 13/86
(Continued)

FOREIGN PATENT DOCUMENTS

JP      2014215828 A   *  11/2014
KR   10-2013-0095519      8/2013
(Continued)

OTHER PUBLICATIONS

JP-2014215828-A Machine Translation via Google Patents (Year: 2014).*

(Continued)

*Primary Examiner* — Fernando Alcon
(74) *Attorney, Agent, or Firm* — Staas & Halsey LLP (57) ABSTRACT

The disclosure relates to a portable apparatus which displays an image of an area of a 360 degree image that is received from a server, the area moving according to a change of a user view point, and allows a display apparatus to display an image to be synchronized.

14 Claims, 10 Drawing Sheets

(51) Int. Cl.
  *H04N 21/43*     (2011.01)
  *H04N 21/414*    (2011.01)
  *H04N 21/4363*   (2011.01)
  *H04N 21/81*     (2011.01)

(52) U.S. Cl.
  CPC . *H04N 21/43076* (2020.08); *H04N 21/43637* (2013.01); *H04N 21/816* (2013.01)

(56) References Cited

U.S. PATENT DOCUMENTS

| | | | |
|---|---|---|---|
| 11,181,990 B2 * | 11/2021 | Marks | A63F 13/86 |
| 2011/0128364 A1 | 6/2011 | Ono | |
| 2011/0151837 A1 | 6/2011 | Winbush, III | |
| 2012/0087571 A1 * | 4/2012 | Lee | H04N 13/167 382/154 |
| 2012/0274750 A1 * | 11/2012 | Strong | H04L 65/4084 348/52 |
| 2015/0012952 A1 * | 1/2015 | Sato | H04N 21/8133 725/74 |
| 2015/0243078 A1 | 8/2015 | Watson et al. | |
| 2017/0026667 A1 * | 1/2017 | Pasko | G11B 27/28 |
| 2017/0264792 A1 * | 9/2017 | Lee | G06F 3/1423 |
| 2018/0091704 A1 * | 3/2018 | Koyama | H04N 5/0733 |
| 2018/0108172 A1 * | 4/2018 | Huston | G06Q 50/01 |
| 2018/0247676 A1 * | 8/2018 | Raphael | G11B 27/11 |
| 2018/0330515 A1 * | 11/2018 | Stall | G06T 19/003 |
| 2018/0359458 A1 * | 12/2018 | Iwakiri | H04N 13/122 |
| 2019/0114802 A1 * | 4/2019 | Lazarow | G06F 3/012 |
| 2020/0007921 A1 * | 1/2020 | Ojala | H04L 65/4092 |
| 2020/0107003 A1 * | 4/2020 | Phillips | H04N 19/167 |
| 2020/0128178 A1 * | 4/2020 | Shi | G06T 3/00 |
| 2020/0128232 A1 * | 4/2020 | Hwang | H04N 13/344 |
| 2020/0145636 A1 * | 5/2020 | Jang | H04N 13/344 |
| 2020/0322591 A1 * | 10/2020 | Yano | H04N 13/279 |
| 2020/0322696 A1 * | 10/2020 | Dvir | H04N 5/23238 |
| 2020/0336668 A1 * | 10/2020 | Hutsler | H04N 5/247 |
| 2021/0099507 A1 * | 4/2021 | Duanmu | H04N 13/111 |
| 2021/0225065 A1 * | 7/2021 | Holzer | H04N 5/23216 |
| 2021/0227195 A1 * | 7/2021 | Holzer | H04N 5/23219 |
| 2021/0243418 A1 * | 8/2021 | Ojala | H04N 21/6587 |

FOREIGN PATENT DOCUMENTS

| | | | | |
|---|---|---|---|---|
| KR | 10-2014-0110047 | | 9/2014 | |
| KR | 10-2016-0145976 | | 12/2016 | |
| KR | 10-2017-0120977 | | 11/2017 | |
| KR | 10-2017-0132505 | | 12/2017 | |
| WO | WO-2018128472 A1 * | 7/2018 | | G06F 1/1626 |
| WO | WO-2019209588 A1 * | 10/2019 | | H04N 13/117 |

OTHER PUBLICATIONS

International Search Report dated Sep. 6, 2019 from International Application No. PCT/KR2019/005888, 4 pages.

* cited by examiner

PORTABLE DEVICE AND CONTROL METHOD THEREOF

CROSS-REFERENCE TO RELATED APPLICATIONS

This application is a U.S. National Stage Application, which claims the benefit under 35 U.S.C. § 371 of PCT International Patent Application No. PCT/KR2019/005888, filed May 17, 2019 which claims the foreign priority benefit under 35 U.S.C. § 119 of Korean Patent Application No. 10-2018-0124125, filed Oct. 18, 2018, the contents of which are incorporated herein by reference.

TECHNICAL FIELD

The disclosure relates to a portable apparatus and a control method thereof which displays an area of a 360 degree image while moving the area according to change of a user view point to allow a display apparatus to display an image to be synchronized with the area of the 360 degree image.

BACKGROUND ART

Recently, a virtual experience using a miniaturized portable apparatus has been popular. The virtual experience, which is so called a virtual reality, allows a user to feel vividness and realism as if the user would be in a virtual place, where an image that is displayed is changed according to movement of the user.

For example, a head mounted display (HMD) which is a wearable device put on a user's head allows the user to have a feeling as if the user would be in the virtual place by displaying in front of the user's eye a 360 degree image which is received from a server by streaming according to change of a user view point.

In addition, when using a mirroring function which synchronously displays the image displayed at the HMD on a display apparatus according to the change of the user view point, it is possible for neighboring users to have the virtual experience together with the user of the HMD because the neighboring users also watch through the display apparatus the 360 degree image according to the change of the user view point of the HMD.

Such mirroring function can be embodied in a method of wirelessly transmitting from the HMD to the display apparatus the image which is displayed at the HMD according to the view point change. However, because the image which is displayed at the HMD is a high definition image such as ultra-high definition (UHD), the HMD has a burden that consumes resources and power in order to display the high definition image as well as to transmit the high definition image to the display apparatus. As an alternative, the HMD transmits the high definition image to the server, while the server transmits the high definition image to the display apparatus, where, however, the server has a burden of consuming enormous resources in that the server has to process the high definition images which are transmitted from a number of the HMDs.

Therefore, required is a solution to embody the mirroring function for the 360 degree image through the display apparatus while the HMD uses resources and power efficiently.

Also, although the HMD uses resources and power efficiently, precision of synchronization may decrease due to time delay which happens in a process of the mirroring function through the display apparatus.

Therefore, also required is a solution to allow the display apparatus to perform the synchronization precisely, while the HMD uses resources and power efficiently.

Technical Problem

Accordingly, an aspect of the disclosure is to provide a portable apparatus and a control method thereof which are capable of allowing the mirroring function where the efficiency of resources and power and the precision of the synchronization are enhanced.

Technical Solution

According to an embodiment of the disclosure, there is provided a portable apparatus including: a display; a wireless communicator configured to perform a wireless communication with a server and a display apparatus; and a processor configured to: display on the display an image of an area of a 360 degree image which is received from the server, the area moving according to a change of a user view point, and transmit information on the user view point and a timing to display the image of the area to the display apparatus in order to allow the display apparatus to display an image to be synchronized with the image of the area.

Here, the processor may be further configured to transmit to the display apparatus information, which is needed to receive the 360 degree image, in order to allow the display apparatus to receive the 360 degree image from the server based on the transmitted information.

Here, the processor may be further configured to transmit to the display apparatus the information, which is needed to receive the 360 degree image, in response to at least one of power-on of the portable apparatus or an execution of a content or application of the 360 degree image.

Here, the portable apparatus may further include a user input part configured to receive a user input, wherein the processor may be further configured to transmit to the display apparatus the information, which is needed to receive the 360 degree image, in response to the received user input.

Here, the processor may be further configured to execute a first application to display the 360 degree image and transmit a signal to execute a second application of the display apparatus to the display apparatus.

According to an embodiment of the disclosure, there is also provided a display apparatus including: a display; a wireless communicator configured to perform a wireless communication with a server and a portable apparatus; and a processor configured to: receive information from the portable apparatus on a user view point for an area of a 360 degree image and a timing to display an image of the area, and based on the user view point and the timing of the image, display on the display an image to be synchronized with the image which is displayed by the portable apparatus, where the area moves.

Here, the processor may be further configured to receive from the portable apparatus information, which is needed to receive the 360 degree image, and receive the 360 degree image from the server based on the transmitted information.

Here, the processor may be further configured to receive from the portable apparatus the information, which is needed to receive the 360 degree image, in response to at least one of power-on of the portable apparatus or an execution of a content or application of the 360 degree image.

Here, the display apparatus may further include a user input part configured to receive a user input, wherein the processor may be further configured to transmit to the portable apparatus a signal to request the information, which is needed to receive the 360 degree image, in response to the received user input.

Here, the processor may be further configured to execute a first application to display the 360 degree image and transmit a signal to execute a second application of the portable apparatus to the portable apparatus.

According to an embodiment of the disclosure, there is also provided a method of controlling a portable apparatus, including: displaying an image of an area of a 360 degree image which is received from a server, the area moving according to a change of a user view point; and transmitting information on the user view point and a timing to display the image of the area to the display apparatus in order to allow the display apparatus to display an image to be synchronized with the image of the area.

Here, the transmitting may include allowing the display apparatus to receive the 360 degree image from the server based on the transmitted information.

Here, the allowing to receive the 360 degree image may include transmitting to the display apparatus the information, which is needed to receive the 360 degree image, in response to at least one of power-on of the portable apparatus or an execution of a content or application of the 360 degree image.

Here, the allowing to receive the 360 degree image may include transmitting to the display apparatus the information, which is needed to receive the 360 degree image, in response to a user input.

Here, the allowing to receive the 360 degree image may include executing a first application to display the 360 degree image and transmitting a signal to execute a second application of the display apparatus to the display apparatus.

According to an embodiment of the disclosure, there is also provided a method of controlling a display apparatus, including: receiving information from a portable apparatus on a user view point for an area of a 360 degree image and a timing to display the image of the area, and based on the user view point and the timing of the image, displaying an image to be synchronized with the image which is displayed by the portable apparatus, where the area moves.

Here, the receiving may include receiving from the portable apparatus information, which is needed to receive the 360 degree image, and receiving the 360 degree image from the server based on the transmitted information.

Here, the receiving the 360 degree image may include receiving from the portable apparatus the information, which is needed to receive the 360 degree image, in response to at least one of power-on of the portable apparatus or an execution of a content or application of the 360 degree image.

Here, the receiving the 360 degree image may include, in response to execution of a first application of the portable apparatus for displaying the 360 degree image, receiving a signal to allow a second application for displaying the image to be executed.

According to an embodiment of the disclosure, there is also provided a recording medium in which a computer-readable program, the program may including: displaying an image of an area of a 360 degree image which is received from a server, the area moving according to a change of a user view point; and transmitting information on the user view point and a timing to display the image of the area to a display apparatus in order to allow the display apparatus to display an image to be synchronized with the image of the area.

Advantageous Effects

As described above, according to the disclosure, it is possible to provide a portable apparatus and a control method thereof which are capable of allowing the mirroring function where the efficiency of resources and power and the precision of the synchronization are enhanced.

BEST MODE

Below, various embodiments of the disclosure will be described with reference to accompanying drawings. The following embodiments have to be considered as illustrative only, and it should be construed that all suitable modification, equivalents and/or alternatives fall within the scope of the disclosure. Throughout the drawings, like numerals refer to like elements. In the disclosure, a term "at least one of" a plurality of elements or the like may not refer to all of the plurality of elements but also to each and every possible combination of the elements.

Figure 1:
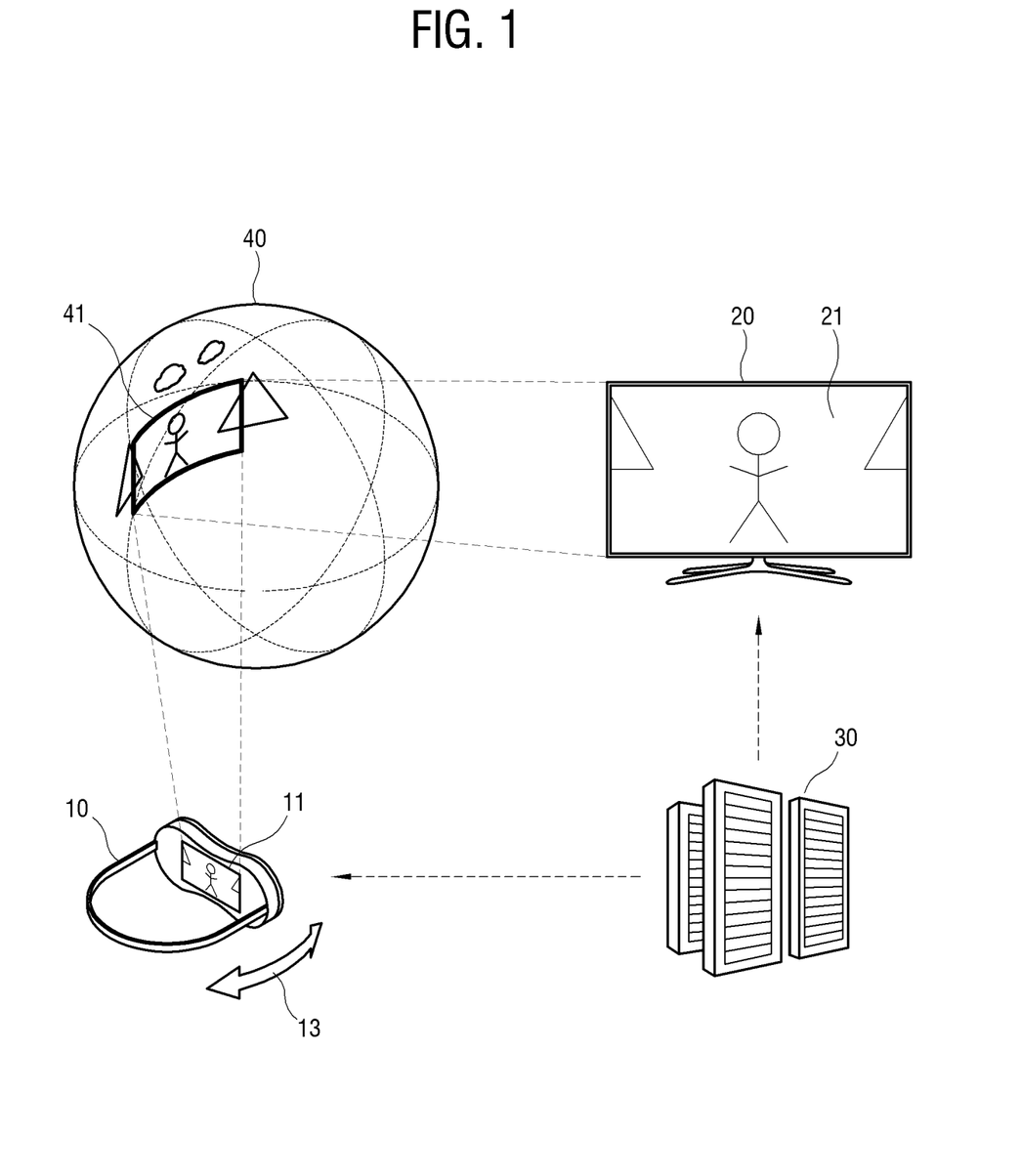
FIG. 1 illustrates an example of a portable apparatus which performs a mirroring function through a display apparatus.

FIG. 1 illustrates an example of a portable apparatus which performs a mirroring function through a display apparatus 20. As described FIG. 1, the portable apparatus 10 displays an image according to a movement 13. Here, the movement 13 may be at least one of a forward-backward/left-right/up-down movement or a left-right/up-down rotation. For example, the portable apparatus 10 may be embodied as an HMD which is wearable on a user's head, where when the user wearing the device turns the user's head in a clockwise direction at an angle, the HMD displays an image which is applied with the movement 13 of the turn in the same direction and at the same angle. Below, for the sake of description, an example will be described supposing that the portable apparatus 10 is embodied as the HMD. However, the disclosure is not limited to the HMD, and the portable apparatus 10 may be embodied as a wearable device such as a smart watch, a smart phone, a tablet, a multimedia player, an electronic picture frame, etc. which is capable of displaying an image that is applied with the movement 13.

The portable apparatus 10 receives a 360 degree image from a server 30 by streaming. The server 30 may a content providing server, and the provided content may be a game, a navigation, etc. using the 360 degree image but is not limited thereto.

The portable apparatus 10 displays an image for an area of the 360 degree image based on an image signal which is received. When a user view point changes according to the movement 13, the portable apparatus 10 displays an image 11 of an area 41 that corresponds to the user view point among the areas of the 360 degree image.

The portable apparatus 10 of the embodiment performs a mirroring function which allows the display apparatus 20 to display an image 21 that is synchronized with the image 11 which is displayed at the portable apparatus 10. Specifically, the portable apparatus 10 transmits to the display apparatus 20 information on the user view point which changes according to the movement 13 and a timing to display the image 11 of the area 41 corresponding to the user view point.

The display apparatus 20 may display the image 21 which is synchronized with the image 11 of the portable apparatus 10 by displaying, based on the image signal which is received from the server 30, the image 21 of the area 41 that corresponds to the user view point from the portable apparatus 10 among the areas of the 360 degree image according to the timing to display the image 11 at the portable apparatus 10.

In this way, because the portable apparatus 10 can perform the mirroring function by transmitting, while displaying the image 11, to the display apparatus 20 the information on the user view point and the timing to display the image 11, resources and power are not excessively consumed in transmitting the information for the mirroring function. Therefore, it is possible to enhance the efficiency of the resources and power for performing the mirroring function.

Figure 2:
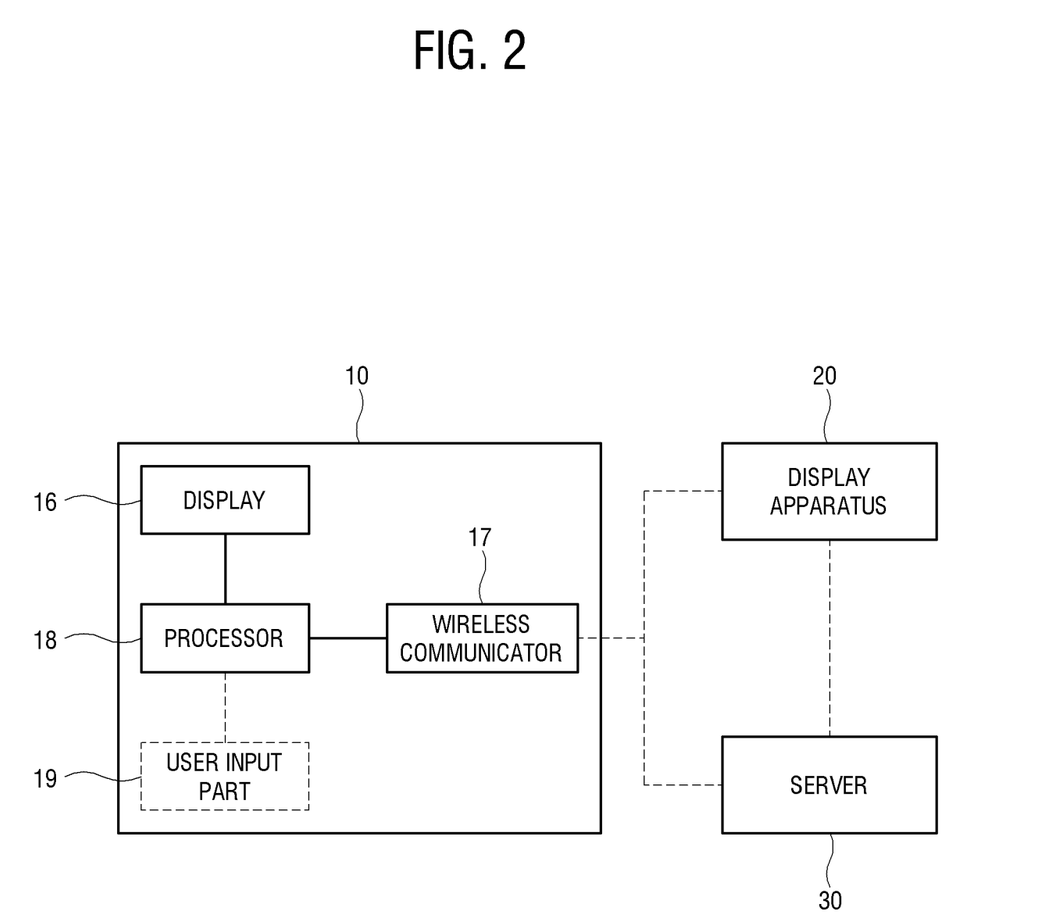
FIG. 2 illustrates a configuration of the portable apparatus of FIG. 1.

FIG. 2 illustrates a configuration of the portable apparatus 10 of FIG. 1. As illustrated in FIG. 2, the portable apparatus 10 of FIG. 1 includes a display 16, a wireless communicator 17 and a processor 18.

The display 16 displays the 360 degree image based on the image signal according to the change of the user view point. Examples of the display 16 are not limited and may be embodied as liquid crystal, plasma, a light-emitting diode, an organic light-emitting diode, a surface-conduction electron-emitter, a carbon nano-tube, nano-crystal, etc.

The wireless communicator 17 performs a wireless communication with the server 30 and the display apparatus 20. The wireless communicator 17 may perform a high-speed wireless communication with the server 30 to receive a high-definition image signal such as the 360 degree image from the server 30. For example, the wireless communicator 17 may perform the wireless communication with the server 30 in a 5th-Generation communication which provides a higher data transmission rate than a conventional 4th-Generation communication. However, the disclosure is not limited thereto, and the wireless communicator 17 may perform the high-speed wireless communication with the server 30 in wireless HD (WiHD), wireless gigabit alliance (WiGig), etc.

Also, the wireless communicator 17 performs the wireless communication with the display apparatus 20 to transmit to the display apparatus 20 the information on the user view point for the image 11 of the area 41 of the 360 degree image and the timing to display the image 11 of the area 41. For example, the wireless communicator 17 performs the wireless communication with the display apparatus 20 in one of Bluetooth, Bluetooth low energy (BLE), infrared data association (IrDA), Wi-Fi, ZigBee, Wi-Fi Direct (WFD), ultra-wideband (UWB), near field communication (NFC), etc.

The wireless communicator 17 may be embodied as two or more wireless communication modules or a single integrated module for performing the wireless communication with the server 30 and the display apparatus 20.

The processor 18 controls a general operation of the portable apparatus 10. The processor 18 may control the display 16 to display the image 11 of the area 41 of the 360 degree image according to the change of the user view point based on the image signal which is received from the server 30.

Also, the processor 18 may control the wireless communicator 17 to transmit to the display apparatus 20 the information on the user view point for the area 41 and the timing to display the image 11 of the area 41, while displaying the image 11.

The processor 18 may include a control program (or an instruction) for performing the general control to elements, a nonvolatile memory in which the control program is installed, a volatile memory in which at least a part of the installed control program is loaded, and at least one processor or central processing unit (CPU) for executing the loaded control program. Further, such a control program may be stored in another portable apparatus other than the portable apparatus 10.

The control program may include a program(s) actualized in the form of at least one among a basis input/output system (BIOS), a device driver, an operating system, a firmware, a platform, and an application program. According to an embodiment, the application program may be previously installed or stored when the portable apparatus 10 is manufactured, or may be installed based on application data received from the outside when it is used in the future. The application data may for example be downloaded from an application market and the like server. Such a server is an example of a computer program product, but not limited to this example.

Further, the processor 18 may employ at least one of machine learning, a neural network or a deep-learning algorithm as a rule-based or artificial-intelligence algorithm to perform at least a part of data analysis, process, and result information generation for displaying the image 11 of the area 41 of the 360 degree image according to the change of the user view point based on the image signal which is received from the server 30 or transmitting to the display apparatus 20 the information on the user view point for the area 41 and the timing to display the image 11 of the area 41.

However, FIG. 2 does not limit the elements of the portable apparatus 10, and thus the portable apparatus 10 may exclude some elements or include another element not shown in FIG. 2. For example, the portable apparatus may further include at least one of a user input part, a battery part or a storage. The user input part 19 receives a user input and forwards the user input to the processor 18. The user input part may be embodied as various forms according to a type of the user input, for example, a menu button which is provided outside of the portable apparatus 10, a touch screen which is provided on the display and receives a user touch input, or a sensor which senses the movement 13 by the user.

In case of the senser, the senser includes at least one of a three-axes or six-axes sensor, an acceleration sensor and a gravity sensor.

The battery part power stores from outside according to the control of the processor 18 or supplies the power to each configuration of the portable apparatus 10, and the storage stores instructions, programs, applications, etc. to control the portable apparatus 10. For example, the storage may include a recording medium of at least one type among a flash memory type, a hard disk type, a multimedia card micro type, a card type memory (such as a secure digital (SD) memory, an extreme digital (XD) memory, etc.), a random access memory (RAM), a static random access memory (SRAM), etc.

Figure 3:
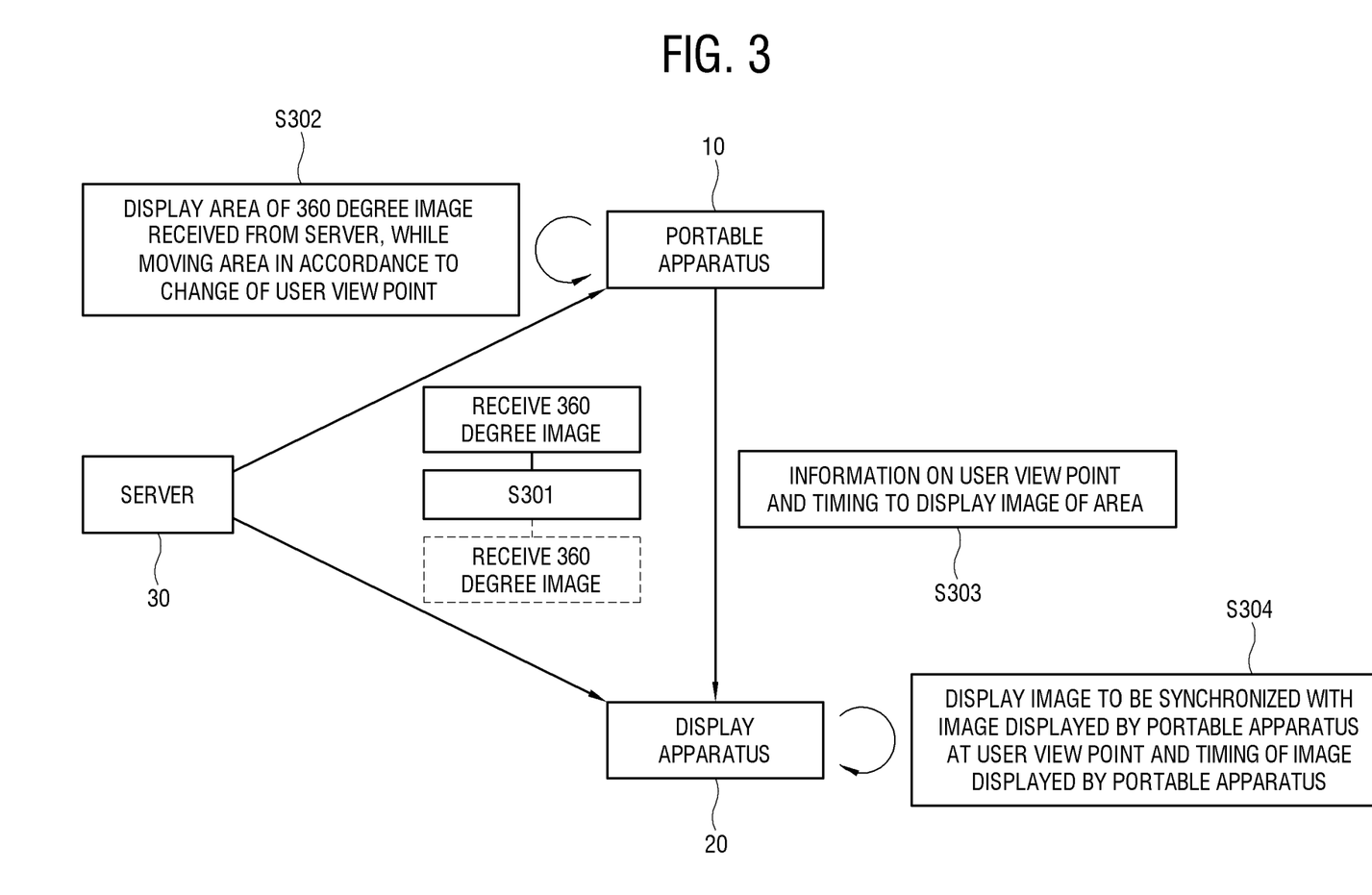
FIG. 3 illustrates a control method of the portable apparatus of FIG. 1.

FIG. 3 illustrates a control method of the portable apparatus 10 of FIG. 1. The control method of the embodiment may be performed by the processor 18 to execute the control program described above. Below, for the sake of description, operations that the processor 18 executes the control program to perform will be described as, simply, operations of the processor 18.

Referring to FIG. 3, the processor 18 receives the 360 degree image from the server 30 (S301). The processor 18 receives the 360 degree image from the server 30 by streaming in real time, and may perform the high-speed wireless communication such as the 5th-Generation communication with the server 30. In a similar way, the display apparatus 20 receives the 360 degree image from the server 30.

The portable apparatus 10 displays the image 11 of the area 41 of the 360 degree image which is received from the server 30, while moving the area 41 in accordance to the change of the user view point (S302).

The portable apparatus 10 transmits to the display apparatus 20 the information on the user view point and the timing to display the image 11 of the area 41 (S303), whereas the display apparatus 20 displays the image 21 to be synchronized with the image 11 of the area 41 based on the received information (S304).

In this way, because the portable apparatus 10 can perform the mirroring function by transmitting to the display apparatus 20 the information on the user view point and the timing to display the image 11, it is possible to enhance the efficiency of resources and power for performing the mirroring function.

Figure 4:
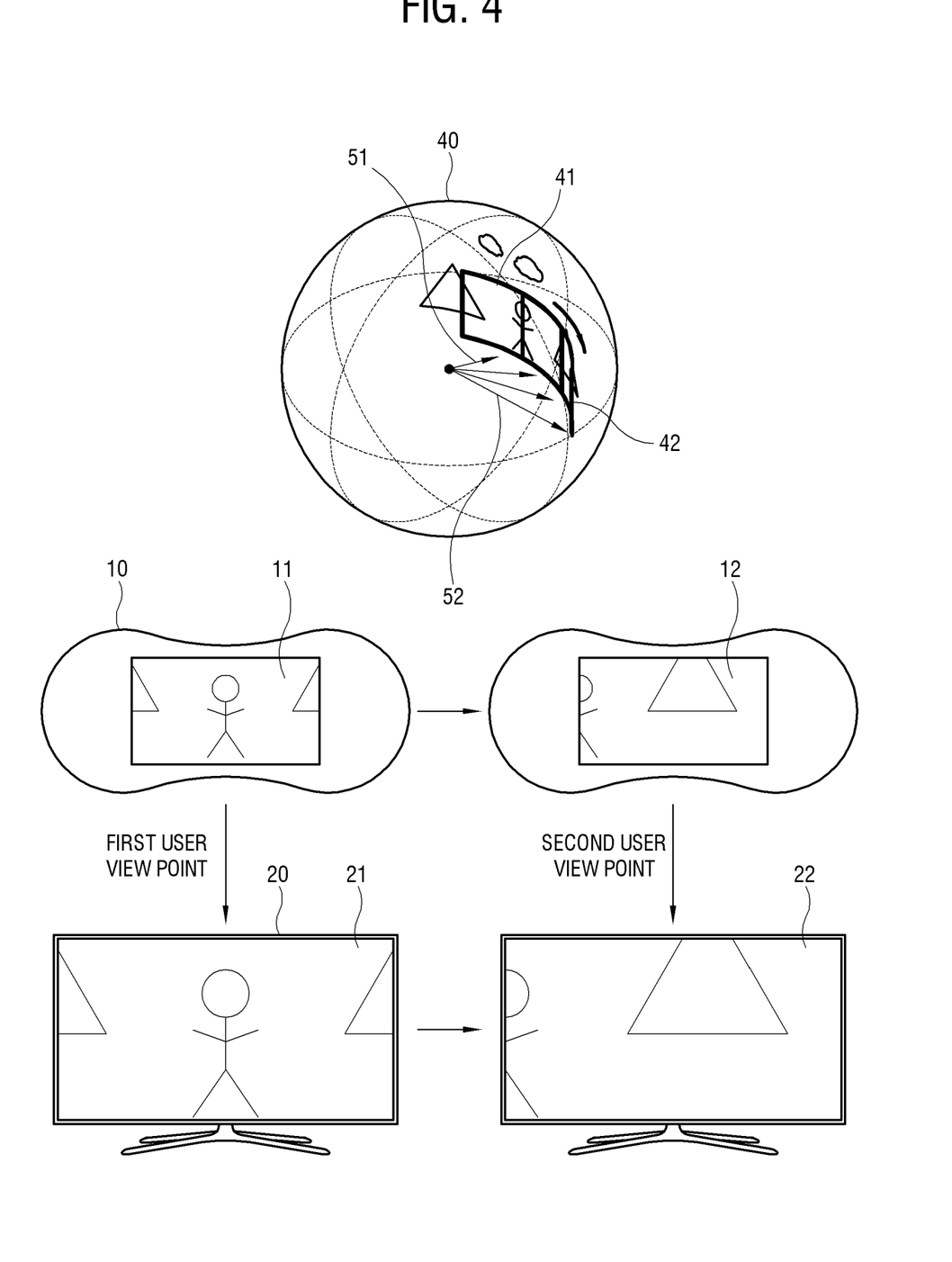
FIG. 4 illustrates an example related to S303 and S304 of FIG. 3 where a user view point is synchronized.

FIG. 4 illustrates an example related to S303 and S304 of FIG. 3 where the user view point is synchronized. Referring to FIG. 4, it is supposed that the portable apparatus 10 displays the image 11 of a first area 41 which corresponds to a first user view point 51 among the areas of the 360 degree image based on the image signal which is received from the server 30 by streaming.

The portable apparatus 10 transmits to the display apparatus 20 the information on the first user view point 51 for performing the mirroring function through the display apparatus 20. The display apparatus 20 displays the image 21 of the area 41 which corresponds to the first user view point 51 from the portable apparatus 10 among the areas of the 360 degree image based on the image signal which is received from the server 30.

If the portable apparatus 10 rotates in a clockwise direction at an angle whiling displaying the image 11 and the first user view point 51 moves into a second user view point 52, the portable apparatus 10 displays an image 12 of a second area which corresponds to the second user view point 52 and transmits the information on the second user view point 52 to the display apparatus 20 to allow the display apparatus 20 to display an image 22 to be synchronized with the image 12 which is displayed at the portable apparatus 10 in accordance to the second user view point 52.

In this way, the portable apparatus 10 displays the image corresponding to the user view point, transmits the information on the user view point to the display apparatus 20, whereas the display apparatus 20 displays the image 22 to be synchronized with the image 12 which is displayed at the portable apparatus 10 based on the user view point that is synchronized with the user view point from the portable apparatus 10, thereby enhancing the precision of the synchronization.

Figure 5:
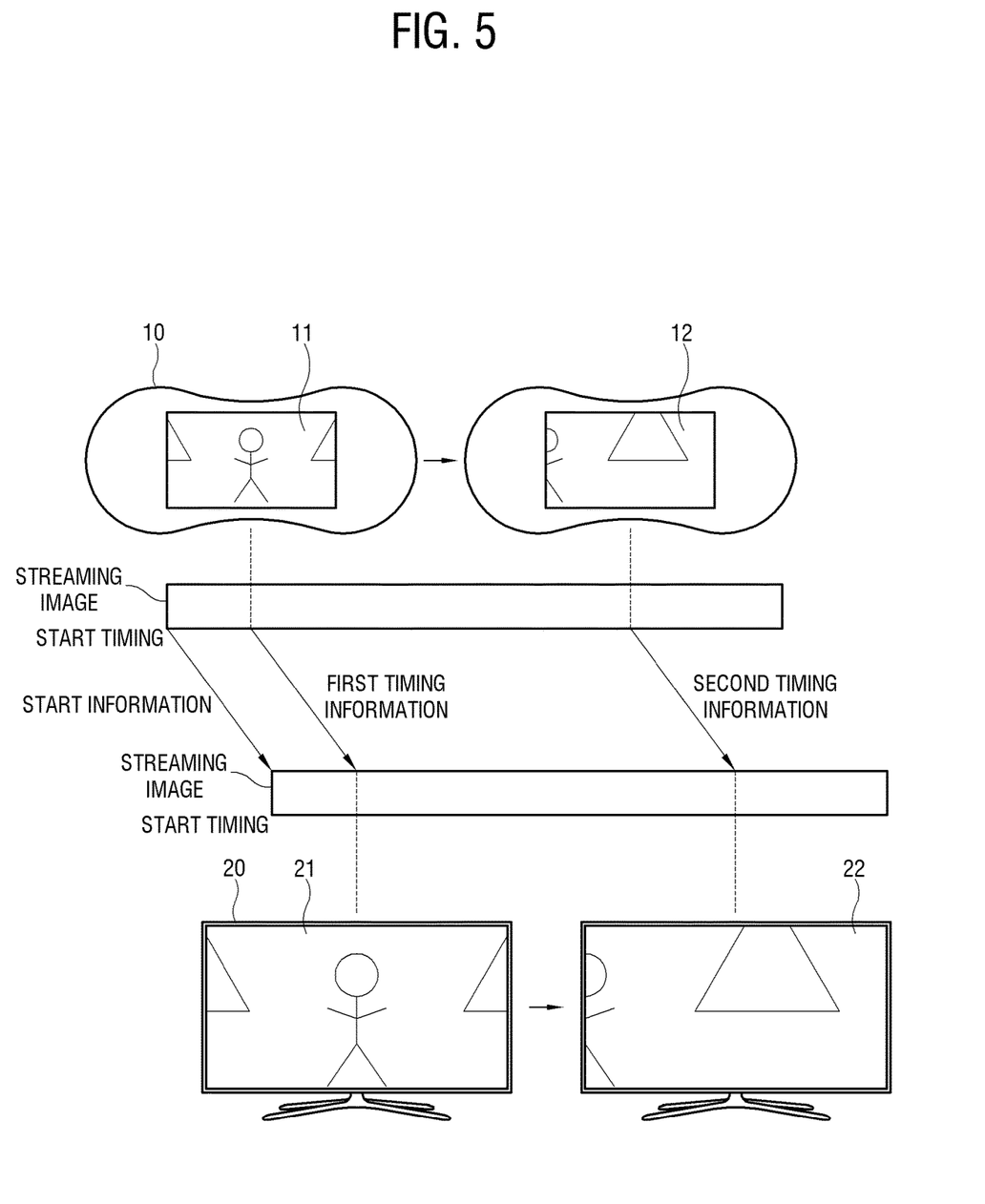
FIG. 5 illustrates an example related to S303 and S304 of FIG. 3 where a timing to display an image corresponding to the user view point is synchronized.

FIG. 5 illustrates an example related to S303 and S304 of FIG. 3 where the timing to display the image corresponding to the user view point is synchronized. As illustrated in FIG. 5, each of the portable apparatus 10 and the display apparatus 20 displays a streaming image based on the image signal which is received from the server 30.

The portable apparatus 10 transmits to the display apparatus 20 start information on the timing when the image starts to be displayed to allow the display apparatus 20 to display an image to be synchronized in a start timing with the image which is displayed at the portable apparatus 10 based on the start information.

The portable apparatus 10 displays the image 11 of the area 41 which corresponds to the first user view point 51 and transmits to the display apparatus 20 first timing information on the timing to display the image 11 according to the first user view point 51. For example, the first timing information may be information on a time when a frame corresponding to the image 11 is displayed with reference to the time when the streaming image starts to be displayed at the portable apparatus 10. The display apparatus 20 displays the image 21 to be synchronized with the image 11 which is displayed at the portable apparatus 10 by displaying based on the first timing information the image 21 of the first user view point 51 at a time when the frame corresponding to the image 11 starts to be displayed with reference to the time when the streaming image starts to be displayed at the display apparatus 10.

In a similar way, the portable apparatus 10 displays the image 12 of the area 42 which corresponds to the second user view point 52 and transmits to the display apparatus 20 second timing information on the timing to display the image 12 according to the second user view point 52. The display apparatus 20 displays the image 22 to be synchronized with the image 12 which is displayed at the portable apparatus 10 by displaying the image 22 corresponding to the second user view point 52 at a time when the image 12 is displayed based on the second timing information.

In this way, the portable apparatus 10 transmits to the display apparatus 20 the information on the timing to display the image corresponding to the user view point to allow the timing when the images 21 and 22 are displayed at the display apparatus 20 to be respectively synchronized with the timing when the images 11 and 12 are displayed at the portable apparatus 10, thereby further enhancing the precision of the synchronization.

Figure 6:
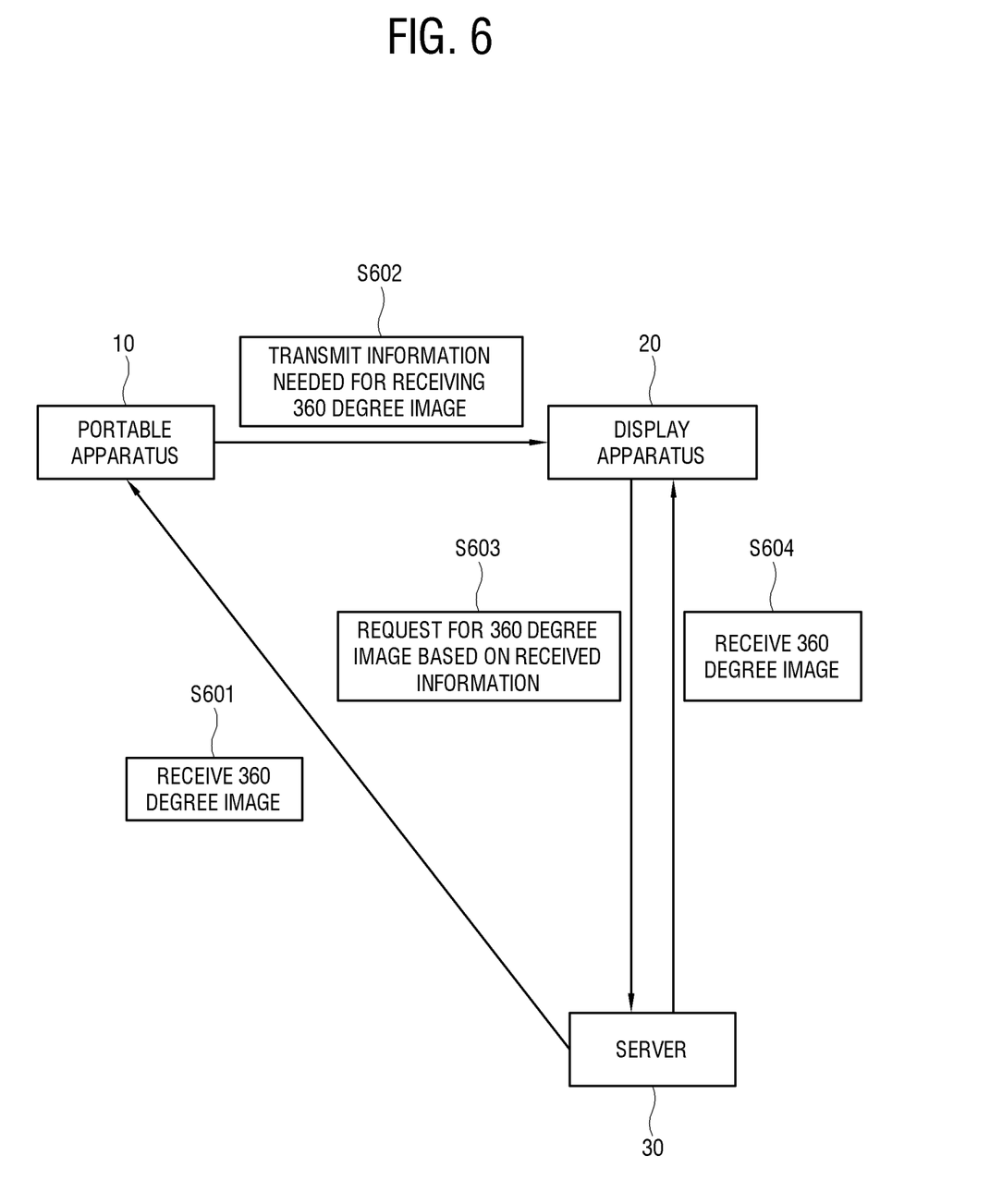
FIG. 6 illustrates an example related to S301 of FIG. 3 where the portable apparatus of FIG. 1 allows the display apparatus to receive a 360 degree image from a server.

FIG. 6 illustrates an example related to S301 of FIG. 3 where the portable apparatus 10 of FIG. 1 allows the display apparatus 20 to receive the 360 degree image from the server 30. As illustrated in FIG. 6, the portable apparatus 10 receives the 360 degree image from the server 30 (S601). For example, the 360 degree image is received by steaming.

The portable apparatus 10 transmits the information needed for receiving the 360 degree image to the display apparatus 20 (S602). For example, the information which is needed for receiving the 360 degree image may be a streaming address to receive the 360 degree image from the server 30.

The display apparatus 20 requests the server 30 to transmit the 360 degree image based on the information which is received from the portable apparatus 10 (S603), whereas the server 30 transmits the 360 degree image to the display apparatus 20 in response to the request for the 360 degree image (S604).

According to this, because the display apparatus 20 can receive the 360 degree image from the server 30 by the portable apparatus 10 without a separate manipulation at the display apparatus 20, it is possible to enhancing user convenience of the mirroring function through the display apparatus 20.

Figure 7:
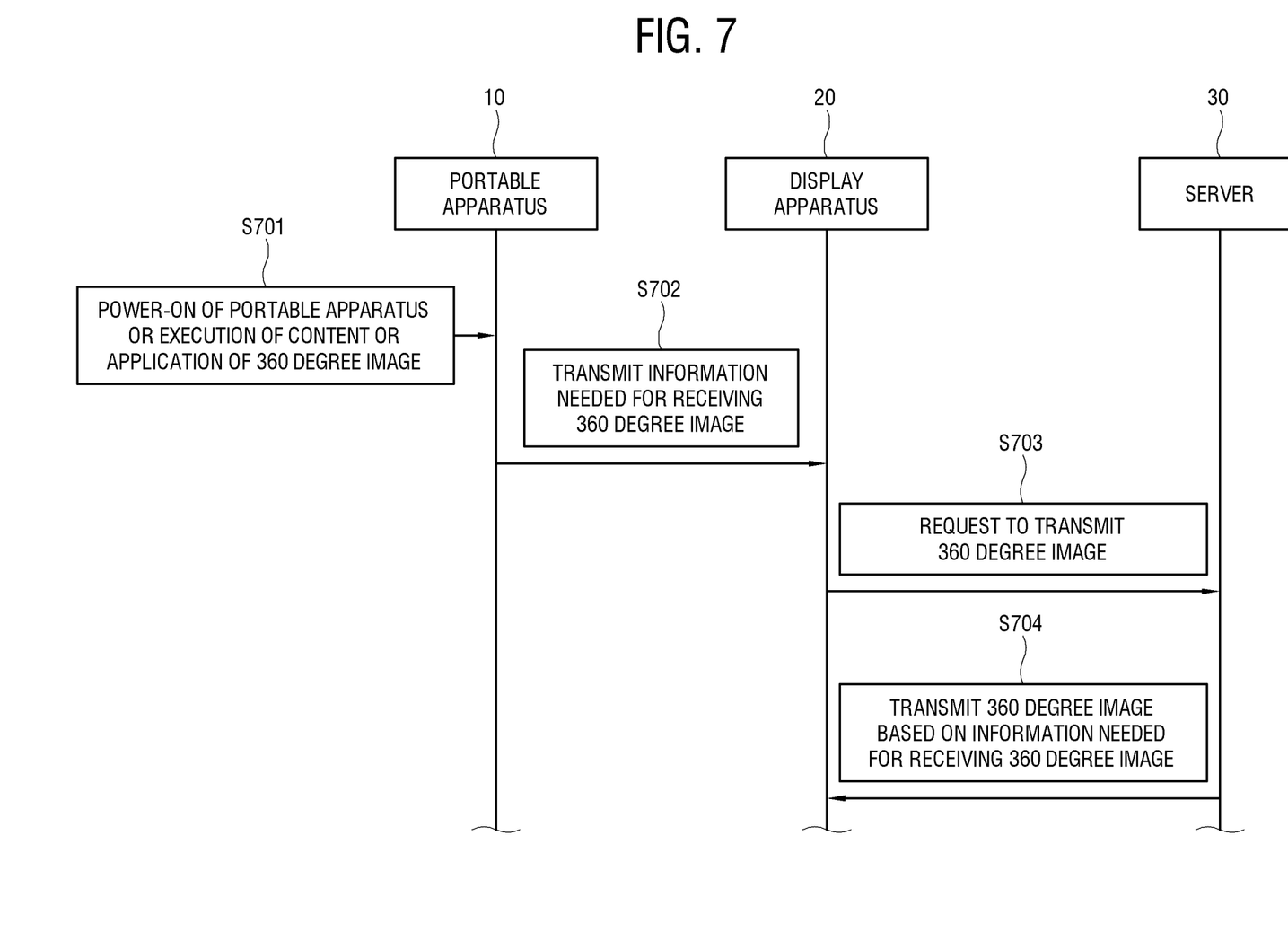
FIG. 7 illustrates an example related to S602 of FIG. 6 where the portable apparatus of FIG. 1 transmits information needed for receiving an image signal in response to an event.

FIG. 7 illustrates an example related to S602 of FIG. 6 where the portable apparatus 10 of FIG. 1 transmits the information needed for receiving the 360 degree image in response to an event. First, as illustrated in FIG. 7, in response to power-on (S701), the portable apparatus 10 transmits the information needed for receiving the 360 degree image to the display apparatus 20 (S702). However, the disclosure is not limited thereto, and the information needed for receiving the 360 degree image may be transmitted to the display apparatus 20 in response to that the portable apparatus 10 executes a content or an application of the 360 degree image. For example, if a game using the 360 degree image is executed or a mirroring application is executed when a mirroring function is selected by a user during the execution of the game, the portable apparatus 10 transmits the information needed for receiving the 360 degree image to the display apparatus 20.

The display apparatus 20 requests the server 30 to transmit the 360 degree image (S703), whereas the server 30 transmits the 360 degree image to the display apparatus 20 in response to the request (S704).

According to this, the user convenience of the mirroring function can be enhanced in that the display apparatus 20 can receive the 360 degree image from the server 30 without a separate manipulation at the display apparatus 20.

Figure 8:
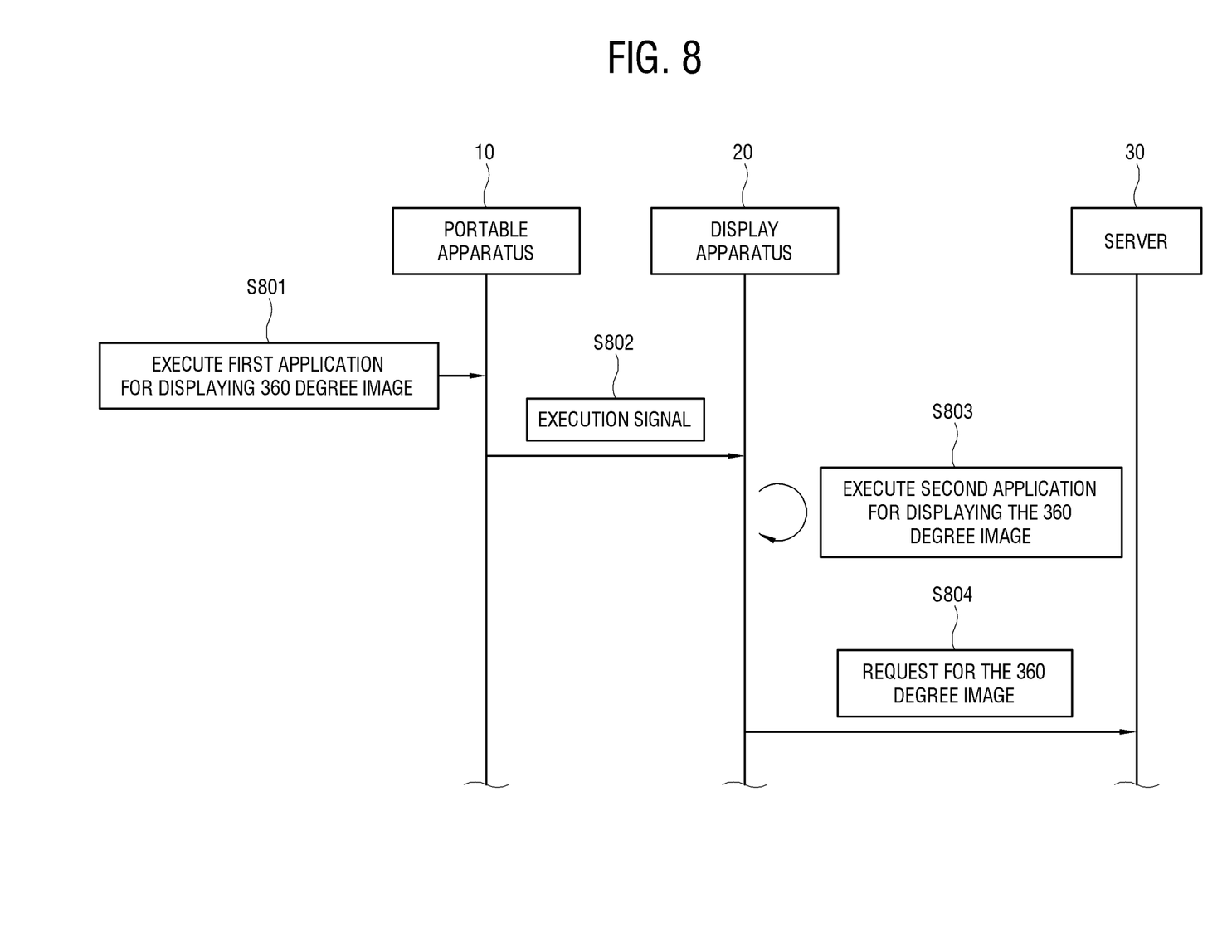
FIG. 8 illustrates an example related to S701 of FIG. 7 where the information needed for receiving the image signal is transmitted in response to execution of a first application of the portable apparatus of FIG. 1.

FIG. 8 illustrates an example related to S701 of FIG. 7 where the information needed for receiving the 360 degree image is transmitted in response to execution of a first application of the portable apparatus 10 of FIG. 1. Referring to FIG. 8, the portable apparatus 10 executes a first application for displaying the 360 degree image (S801), and transmits an execution signal to the display apparatus 20 (S802). For example, the first application may be a game application which proceeds using the 360 degree image.

The display apparatus 20 executes a second application for displaying the 360 degree image based on the execution signal (S803), and requests the server 30 for the 360 degree image in response to execution of the second application (S804). For example, the second application may be an application for the mirroring.

According to this, because the display apparatus 20 can receive the 360 degree image from the server 30 by the execution of the first application of the portable apparatus 10 without a separate manipulation at the display apparatus 20, the user convenience of the mirroring function can be enhanced.

Figure 9:
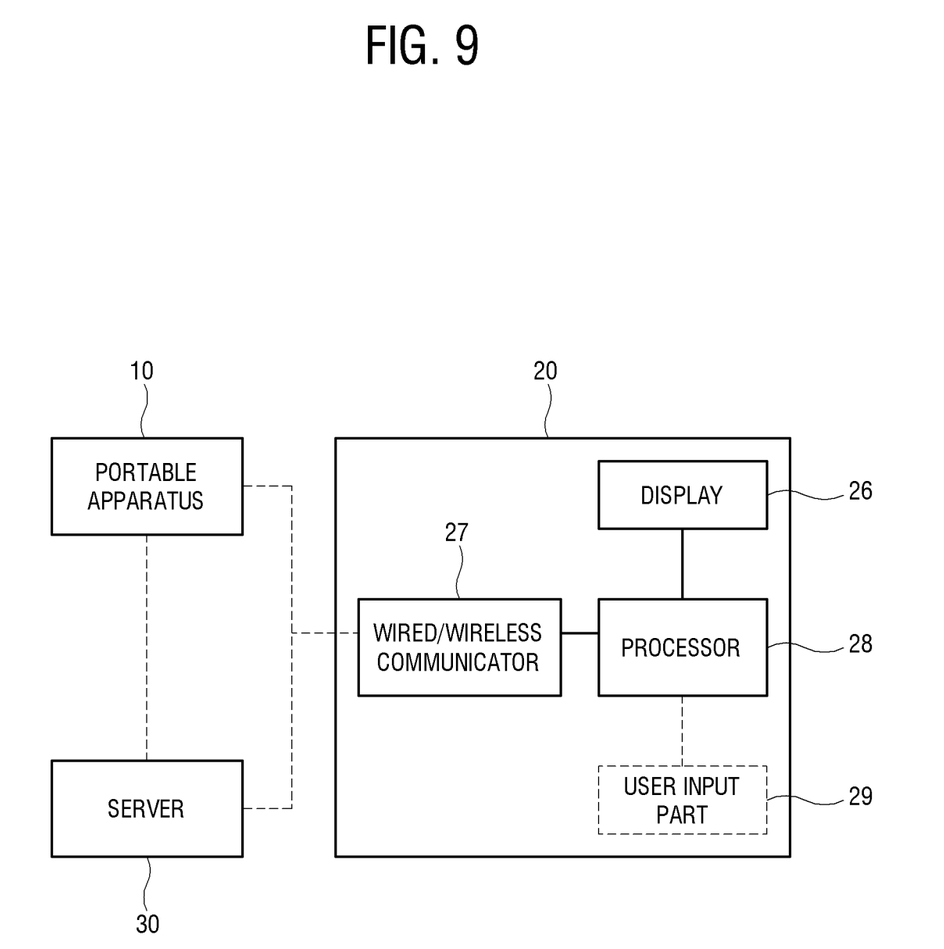
FIG. 9 illustrates a configuration of the display apparatus of FIG. 1.

FIG. 9 illustrates a configuration of the display apparatus 20 of FIG. 1. However, for the sake of description, the portable apparatus 10 of FIG. 1 will be referred to as the portable apparatus 10 of FIG. 1, while the display apparatus 20 according to the embodiment will be referred to as the display apparatus 20 of FIG. 1. Referring to FIG. 9, the display apparatus 20 according to the embodiment includes a display 26, a wired/wireless communicator 27 and a processor 28.

The display 26 displays the 360 degree image based on the image signal according to the change of the user view point. Examples of the display 26 are not limited and may be embodied as liquid crystal, plasma, a light-emitting diode, an organic light-emitting diode, a surface-conduction electron-emitter, a carbon nano-tube, nano-crystal, etc.

The wired/wireless communicator 27 performs the wired communication or the wireless communication with the server 30 and the portable apparatus 10. The wired/wireless communicator 27 may be embodied as two or more wireless communication modules or a single integrated module for performing the wired/wireless communication with the server 30 and the portable apparatus 10.

The wired/wireless communicator 27 may receive the high-definition image signal such as the 360 degree image from the server 30 by streaming. For example, the wired/wireless communicator 27 may receive by streaming from the server 30 through ethernet, wired/wireless local area network, etc. Also, the wired/wireless communicator 27 performs the wireless communication with the portable apparatus 10 to receive from the portable apparatus 10 the information on the user view point for the image 11 of the area 41 of the 360 degree image and the timing to display the image 11 of the area 41. For example, the wired/wireless communicator 27 performs the wireless communication with the portable apparatus 10 in one of Bluetooth, BLE, IrDA, Wi-Fi, ZigBee, WFD, UWB, NFC, etc.

The processor 28 controls a general operation of the display apparatus 20. The processor 28 may display an image of an area of the 360 degree image which is received from the server 30. Also, the processor 28 may receive from the portable apparatus 10 the information on the user view point for the area of the 360 degree image and the timing to display the image of the area, and controls the display 26 to display the image of the area of the 360 degree image while moving the area according to the user view point.

The processor 28 may include a control program (or an instruction) for performing the general control to elements, a nonvolatile memory in which the control program is installed, a volatile memory in which at least a part of the installed control program is loaded, and at least one processor or central processing unit (CPU) for executing the loaded control program. Further, such a control program may be stored in another display apparatus other than the display apparatus 20.

The control program may include a program(s) actualized in the form of at least one among a basis input/output system (BIOS), a device driver, an operating system, a firmware, a platform, and an application program. According to an embodiment, the application program may be previously installed or stored when the display apparatus 20 is manufactured, or may be installed based on application data received from the outside when it is used in the future. The application data may for example be downloaded from an application market and the like server. Such a server is an example of a computer program product, but not limited to this example.

However, FIG. 9 does not limit the elements of the display apparatus 20, and thus the display apparatus 20 may exclude some elements or include another element not shown in FIG. 9. For example, the display apparatus 20 may further include at least one of a user input part, an image signal receiver, an image signal processor, a power part, or a storage. The user input part 29 receives a user input and forwards the user input to the processor 28. The image signal receiver receives an image signal from outside, and the image signal processor processes the received image signal to be displayed. The power part supplies power to each configuration of the display apparatus 20 according to control of the processor 28, and the storage stores instructions, programs, applications, etc. to control the display apparatus 20. For example, storage may store the information, which is received from the portable apparatus 10, on the user view point and the timing to display the image of the area in response to the user view point.

The storage may include a recording medium of at least one type among a flash memory type, a hard disk type, a multimedia card micro type, a card type memory (such as a secure digital (SD) memory, an extreme digital (XD) memory, etc.), a random access memory (RAM), a static random access memory (SRAM), etc.

Figure 10:
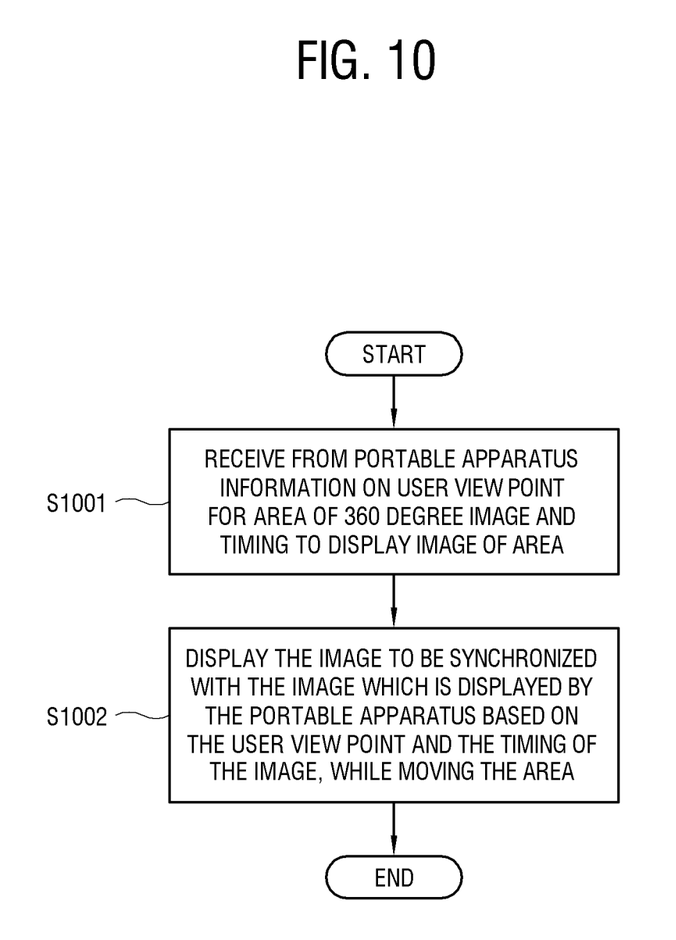
FIG. 10 illustrates a control method of the display apparatus of FIG. 9.

FIG. 10 illustrates a control method of the display apparatus 20 of FIG. 9. As described with reference to FIG. 9, for the sake of description, the portable apparatus 10 of FIG. 1 will be referred to as the portable apparatus 10 of FIG. 1, while the display apparatus 20 according to the embodiment will be referred to as the display apparatus 20 of FIG. 1. Referring to FIG. 10, the display apparatus 20 receives from the portable apparatus 10 the information on the user view point for the area of the 360 degree image and the timing to display the image of the area (S1001).

Also, the display apparatus 20 displays the image to be synchronized with the image which is displayed by the portable apparatus 10 based on the user view point and the timing of the image, while moving the area (S1002).

According to this, when the display apparatus 20 performs the synchronization with the image which is displayed at the portable apparatus 10, the precision of the synchronization can be enhanced.

Although the exemplary embodiments have been described, the disclosure is not limited thereto and may be variously embodied within the scope of the claims.

The invention claimed is:

1. A portable apparatus comprising:
   a display;
   a wireless communicator configured to perform a wireless communication with a server and a display apparatus; and
   a processor configured to:
      receive a first 360 degree image of a content from the server,
      display on the display an image of an area of the first 360 degree image, the area moving according to a change of a user view point, and
      transmit to the display apparatus, information on the content, information on the user view point corresponding to the area and timing information to display the image of the area so that the display apparatus requests a second 360 degree image corresponding to the first 360 degree image of the content to the server based on the information on the content, synchronizes an image of an area of the second 360 degree image with the image of the area of the first 360 degree image based on the information on the user view point and the timing information, and displays the synchronized.

2. The portable apparatus according to claim 1, wherein the processor is further configured to transmit, to the display apparatus, the information on the content, the information on the user view point and the timing information, in response to at least one of power-on of the portable apparatus or an execution of the content or application of the first 360 degree image.

3. The portable apparatus according to claim 1, further comprising a user input part configured to receive a user input,
   wherein the processor is further configured to transmit to the display apparatus, the information on the content, the information on the user view point and the timing information, in response to the received user input.

4. The portable apparatus according to claim 1, wherein the processor is further configured to execute a first application to display the first 360 degree image and transmit a signal to execute a second application of the display apparatus to the display apparatus.

5. A display apparatus comprising:
   a display;
   a wireless communicator configured to perform a wireless communication with a server and a portable apparatus which receives a first 360 degree image of a content from the server and displays an image of an area of the first 360 degree image, the area moving according to a change of a user view point; and
   a processor configured to:
      receive, from the portable apparatus, information on the content, information on the user view point corresponding to the area and timing information to display an image of the area,
      request a second 360 degree image corresponding to the first 360 degree image of the content to the server based on the information on the content,
      synchronize an image of an area of the second 360 degree image with the image of the area of the first 360 degree image based on the information on the user view point and the timing information, and
      display on the display the synchronized image.

6. The display apparatus according to claim 5, wherein the processor is further configured to receive, from the portable apparatus, the information on the content, the information on the user view point and the timing information, in response to at least one of power-on of the portable apparatus or an execution of the content or application of the first 360 degree image.

7. The display apparatus according to claim 5, further comprising a user input part configured to receive a user input,
   wherein the processor is further configured to transmit to the portable apparatus, a signal to request the information on the content, the information on the user view point and the timing information, in response to the received user input.

8. The display apparatus according to claim 5, wherein the processor is further configured to execute a first application to display the second 360 degree image and transmit a signal to execute a second application of the portable apparatus to the portable apparatus.

9. A method of controlling a portable apparatus, comprising:
   receiving a first 360 degree image of a content from a server;
   displaying an image of an area of the first 360 degree image, the area moving according to a change of a user view point; and
   transmitting, to a display apparatus, information on the content, information on the user view point corresponding to the area and timing information to display the image of the area so that the display apparatus requests a second 360 degree image corresponding to the first 360 degree image of the content to the server based on the information on the content, synchronizes an image of an area of the second 360 degree image with the image of the area of the first 360 degree image based on the information on the user view point and the timing information, and displays the synchronized image.

10. The method according to claim 9, wherein the transmitting comprises transmitting, to the display apparatus, the information on the content, the information on the user view point and the timing information, in response to at least one of power-on of the portable apparatus or an execution of the content or application of the first 360 degree image.

11. The method according to claim 9, wherein the transmitting comprises transmitting, to the display apparatus, the information on the content, the information on the user view point and the timing information, in response to a user input.

12. A method of controlling a display apparatus, comprising:

receiving, from a portable apparatus which receives a first 360 degree image of a content from a server and displays an image of an area of the first 360 degree image, the area moving according to a change of a user view point, information on the content, information on the user view point corresponding to the area and timing information to display an image of the area, requesting a second 360 degree image corresponding to the first 360 degree image of the content to the server based on the information on the content, synchronizing an image of an area of the second 360 degree image with the image of the area of the first 360 degree image based on the information on the user view point and the timing information, and displaying the synchronized image.

13. The portable apparatus according to claim 1, wherein the image of the area of the first 360 degree image comprises a plurality of frames, and the timing information comprises information on a time when a frame corresponding to the change of the user view point is displayed among the plurality of frames with respect to a time when the image of the area of the first 360 degree image is started to be displayed.

14. The display apparatus according to claim 5, wherein the image of the area of the first 360 degree image comprises a plurality of frames, and the timing information comprises information on a time when a frame corresponding to the change of the user view point is displayed among the plurality of frames with respect to a time when the image of the area of the first 360 degree image is started to be displayed.

* * * * *